United States Patent [19]

Sipos et al.

[11] 4,000,330

[45] Dec. 28, 1976

[54] PASTA PRODUCT

[75] Inventors: Endre F. Sipos, Elmhurst; Larry L. Young, Roselle, both of Ill.

[73] Assignee: Central Soya Company, Inc., Fort Wayne, Ind.

[22] Filed: Apr. 28, 1975

[21] Appl. No.: 572,307

[52] U.S. Cl. .............................................. 426/557
[51] Int. Cl.² ........................................... A23L 1/16
[58] Field of Search ................... 426/557, 516, 451

[56] References Cited

UNITED STATES PATENTS

| | | | |
|---|---|---|---|
| 3,252,805 | 5/1966 | Sienkiewicz et al. | 426/451 |
| 3,484,251 | 12/1969 | Lawrence et al. | 426/557 |
| 3,843,818 | 10/1974 | Wren et al. | 426/557 |

OTHER PUBLICATIONS

Hlynka, I. "Wheat, Chemistry and Technology" 1964, American Association of Cereal Chemists, St. Paul, Minn.

*Primary Examiner*—Raymond N. Jones
*Attorney, Agent, or Firm*—Tilton, Fallon, Lungmus, Chestnut & Hill

[57] ABSTRACT

A method of producing a pasta product (macaroni, spaghetti, noodles, etc.) wherein either hard or soft wheat or blends with durum semolina are improved with soy protein isolate to provide physical characteristics in the products substantially equivalent to those of durum semolina pasta in both the conventionally cooked and retorted products while increasing the usable protein content.

1 Claim, No Drawings

PASTA PRODUCT

BACKGROUND OF THE INVENTION

This invention relates to pasta products which some times are referred to as macaroni products. Macaroni is usually defined to be hollow tubes of various sizes and diameters; spaghetti generally refers to solid rods of small diameter; noodles usually designated strips, and there may be a variety of other shapes stamped in various forms from sheets of dough.

Pasta products are produced by extruding a semi-moist dough of semolina size through a die under high pressure. The pasta considered ideal for cooking and eating qualities is produced from 100% durum semolina. Durum semolina is the purified middlings of durum wheat ground so that all of the product passes a No. 20 U.S. sieve, and not more than 3% passes through a No. 100 U.S. sieve.

Durum wheats vary quite widely in characteristics depending upon the variety and environment in which they are grown. However, they constitute a distinct species of wheat (Triticum durum) which are different from the common bread wheat (Triticum vulgara). The durum wheat kernel is very hard and both the endosperm and the individual starch kernels are translucent. It is high in carotenoid pigments, particularly xanthophyll and taraxanthin. This hardness and translucency is apparently dependent on the durum being grown in a dry climate such as exists in the Dakotas and in Western Minnesota. Other semi-arid zones productive of durum wheat include Canada, North Africa, the U.S.S.R. and Argentina.

In 1953 a new race of stem rust attacked all available varieties of durum which significantly reduced the durum supply until plant breeders developed new resistant varieties. This situation has continued to the present and has been worsened by the substantial increase in pasta consumption.

Attempts have been made to blend other wheats either alone or with durum semolina to remedy this situation — the common bread wheats (generally referred to as hard or soft wheats) being substantially cheaper in cost — sometimes one-half the cost. However, it has been found that any reduction in the amount of durum semolina in favor of other ingredients normally reduces the desirable cooking and eating qualities.

The desirable characteristics of a pasta are firmness — a slight chewiness while still being tender, high water retention and swelling on cooking, low solids loss on cooking, high resistence to overcooking, low ash content, and eating quality. These are all realized in a pasta made from durum wheat particularly because it gives a high strength in the extruded product and low loss of solids on cooking.

Another desirable characteristic of pasta is a translucent, pale amber color. This stems from the fact that durum wheats generally have a higher level of carotenoid pigments than all other wheats. This, then has been another distinguishing characteristic of pastas made from durum wheats, and this tradition persists notwithstanding the fact that some wheats may have lower carotenoid levels and still produce superior pasta products.

It will be appreciated that the principal step in the production of pasta is the extrusion step, usually performed on durum semolina which has been hydrated to about 31% moisture and with the ingredients kneaded to obtain a plastic, homogeneous dough. After extrusion, the products are dried and usually packaged and sold.

THE INVENTION

We have found that the cheaper, more abundant common wheats (hard or soft wheat or mixtures thereof) can be beneficiated either as such or in a mixture with durum semolina if isolated soy protein is added. Isolated soy protein is defined as the major proteinaceous fraction of soybeans prepared from high-quality, sound, clean, dehulled, soybeans by removing a preponderance of the non-protein components so that the remainder contains not less than 90% protein (N × 6.25) on a moisture free basis.

In addition to maintaining the physical characteristics of the augmented wheat equivalent to that of pure durum semolina, the isolated soy protein provides an advantageous contribution to the protein level of the pasta product. Wheat contains only 11–13% protein and that protein has low levels of the essential amino acid lysine. Where the diet is primarily wheat or other cereals, (also deficient in lysine) fortification of the cereal products is most desirable for raising the nutritional level of the food intake of many people.

DETAILED DESCRIPTION

To illustrate particular embodiments of the invention, spaghetti was prepared using 13 base materials. These cereal bases were differentiated by variations in the wheat component and percentage (durum semolina, hard wheat flour, soft wheat flour), protein additive and percentage and color additive. Standard preparation techniques were followed utilizing a Demaco Laboratory Press and a Standard Sheet Metal Co. dryer. Samples were evaluated for color, cooked weight, cooking loss, firmness and retort stability.

EXPERIMENTAL DETAILS:

A. Materials

The composition and analysis of the various blends tested are shown in Table I, following:

TABLE I

| Run | Description | Moisture | Fat | Protein | Ash | Carbohydrate Total | Fiber |
|---|---|---|---|---|---|---|---|
| 1 | Durum Semolina (DS) | 11.76 | 0.76 | 13.7 | 0.68 | 73.10 | 0.40 |
| 2 | Hard Wheat Flour (HWF) | 12.75 | 0.68 | 11.8 | 0.55 | 74.22 | 0.38 |
| 3 | Soft Wheat Flour (SWF) | 11.88 | 0.91 | 9.8 | 1.10 | 76.31 | 0.38 |
| 4 | 90% Durum Semolina 10% Isolated Soy Protein ISP | 10.40 | 0.85 | 22.0 | 1.00 | 65.75 | 0.43 |
| 5 | 90% Hard Wheat Flour 10% ISP | 11.99 | 0.95 | 19.1 | 0.73 | 67.23 | 0.51 |
| 6 | 90% Soft Wheat Flour 10% ISP | 11.24 | 1.06 | 18.0 | 0.78 | 68.92 | 0.47 |
| 7 | 90% Durum Semolina | 11.09 | 0.94 | 17.5 | 1.11 | 69.36 | 0.81 |

TABLE I-continued

| Run | Description | Moisture | Fat | Protein | Ash | Carbohydrate Total | Fiber |
|---|---|---|---|---|---|---|---|
| 9* | 10% Soy Flour (SF) 50% Durum Semolina 50% Hard Wheat Flour | 10.89 | 0.70 | 12.9 | 0.53 | 74.98 | 0.34 |
| 10 | 50% Durum Semolina 50% Soft Wheat Flour | 11.36 | 0.83 | 11.8 | 0.42 | 65.59 | 0.34 |
| 11 | 45% Durum Semolina 45% Hard Wheat Flour 10% ISP | 10.22 | 0.69 | 20.7 | 0.84 | 67.54 | 0.33 |
| 12 | 45% Durum Semolina 45% Soft Wheat Flour 10% ISP | 10.67 | 0.77 | 19.8 | 0.86 | 67.90 | 0.36 |
| 13 | 90% Hard Wheat Flour 10% ISP Natural Color | | | | | | |
| 14 | 47.37% Durum Semolina 47.37% Hard Wheat Flour 5.26% ISP | | | | | | |
| 15 | 90% Hard Wheat Flour 10% ISP | 11.99 | 0.95 | 19.1 | 0.73 | 67.23 | 0.51 |

*There was no test Run 8.

The isolated soy protein employed was PROMINE F, a commercial product available from Central Soya Company, Inc., Chicago, Ill. and having a protein percentage of 90.9. The soy flour employed was SOYAFLUFF 200W, a commercial product available from Central Soya Company, Inc., Chicago, Ill., and having a protein content of 51.7.

B. Methods

1. Preparation — A 2000gm. batch was prepared for each treatment. Water addition was based on 31.5% absorption. The total weight of cereal base was added to a Hobart Mixer (Model C-100T) bowl. Water (55° C) was added in three steps: (1) ⅓ water, slow speed mixing for 1 minute, high speed mixing for 15 seconds, (2) ⅓ water, slow speed mixing for 1 minute, high speed mixing for 15 seconds, (3) ⅓ water, slow speed for 1 minute, high speed for 1 minute.

The wetted mix was then placed in the mixing chamber of the Demaco Laboratory Press. The material was processed at a rate of about 32 lbs/hour through a spaghetti die.

Spaghetti strands were collected on wooden sticks and placed in a drying cabinet at 41° C., 100% relative humidity until all variables were processed. The strands were then subjected to an 18 hour drying schedule at 41° C. with a programmed decrease of relative humidity to 65%. At the end of this period, the heat was turned off and the samples further cooled to room temperature. The processing conditions for the spaghetti are tabulated in Table II, following:

TABLE II

| Test Variable | Moisture % | Dry Mix (g) | Water Added (ml) | Main Drive (amps) | Mixer Rheostat | Vacuum (in) | Head Temp (° C) | Barrel Temp (° C) | COMMENTS |
|---|---|---|---|---|---|---|---|---|---|
| 1 | 11.8 | 1538 | 467 | 2.0 | 42 | 18 | 35 | 49 | Very wet |
| 9$^a$ | 10.9 | 1523 | 450 | 2.3 | 42 | 18 | 37 | 49 | Light color |
| 10 | 11.4 | 1531 | 445 | 2.0 | 42 | 20 | 40 | 49 | Light color |
| 11 | 10.2 | 1511 | 480 | 2.1 | 42 | 20 | 41 | 49 | Darker than 9 & 10 Looks Better. |
| 12 | 10.7 | 1519 | 481 | 2.0 | 50 | 20 | 39 | 49 | Extruded nicely good color |
| 2 | 12.8 | 1556 | 419 | 2.0 | 50 | 20 | 41 | 49 | White Product extrudes nicely |
| 3 | 11.9 | 1540 | 445 | 2.0 | 50 | 20 | 42 | 49 | White product extrudes nicely |
| 5 | 12.0 | 1542 | 443 | 2.0 | 50 | 20 | 43 | 49 | Darker than 3 |
| 6 | 11.2 | 1528 | 462 | 2.0 | 50 | 19 | 43 | 49 | — |
| 4 | 10.4 | 1514 | 486 | 2.0 | 40 | 19 | 36 | 49 | & Mix left in extruder over lunch, sheared 2 screws upon start |
| 7 | 7.0 | 1483 | 480 | 1.9 | 40 | 18 | 38 | 49 | Soft, ran OK |
| 13 | 12.0 | 1542 | 443 | 2.0 | 40 | 20 | 40 | 49 | — |
| 14 | 11.4$^b$ | 1531 | 445 | 2.0 | 43 | 20 | 42 | 49 | — |
| 15$^c$ | 12.0 | 1542 | 443 | 2.0 | 43 | 18 | — | 49 | — |

$^a$Beginning with this sample 25 ml of water was held from the mix until a subjective determination or consistency was made. If needed, then the water was added.
$^b$Calculated value.
$^c$Heat treatment 2 minutes at 17 psi in autoclave (5 min. coming up, 2 min. going down)

2. Evaluation a. Cooked Weight — Spaghetti (10g) was cooked 20 minutes in boiling water (300 ml), removed, drained for 2 minutes, then weighed.

b. Cooking Loss — Cooking water was evaporated to dryness in an air oven (18 hr. at 90°C) and the residue weighed.

c. Firmness — An Instron Universal Testing Instrument equipped with an Ottawa Texture Measuring Cell was used to determine firmness of the spaghetti. The cooked spaghetti (approximately 30g) was placed in the OTMC. Operating conditions were: crosshead speed 5 inches/min, chart speed 10 inches/min, 0–20 lb. full scale, 9 wire grid with ⅛ inch spacing in OTMC.

d. Color — Spaghetti color scores were determined on a Hunter Color Difference meter. A 2 inch diameter specimen area was covered with spaghetti. The quality criteria of the spaghetti tested are set forth in Table III, following:

that the sample autoclaved after forming was very fragile and broke easily prior to going into the drier.

TABLE III

| Run | Description | Cooked Weight | Cooking Loss | Color | Firmness |
|-----|-------------|---------------|--------------|-------|----------|
| 1   | 100% DS     | 34.7          | 4.3          | 5.5   | 12.4     |
| 4   | 90% DS/10% ISP | 32.1       | 6.7          | 5.5   | 14.1     |
| 2   | 100% HWF    | 35.9          | 6.7          | 4.5   | 11.8     |
| 5   | 90% HWF/10% ISP | 33.2      | 5.6          | 4.5   | 12.6     |
| 3   | 100% SWF    | 35.4          | 7.7          | 4.0   | 9.4      |
| 6   | 90% SWF/10% ISP | 33.8      | 5.5          | 4.5   | 11.4     |
| 1   | 100% DS     | 34.7          | 4.3          | 5.5   | 12.4     |
| 9   | 50% DS/50% HWF | 35.3       | 7.6          | 5.0   | 11.8     |
| 11  | 45% DS/45%HWF/10% ISP | 32.5 | 6.4          | 5.0   | 14.4     |
| 10  | 50% DS/50% SWF | 36.1       | 9.4          | 5.0   | 10.3     |
| 12  | 45% DS/45% SWF/10% ISP | 32.4 | 7.4        | 5.0   | 12.8     |
| 1   | 100% DS     | 34.7          | 4.3          | 5.5   | 12.4     |
| 11  | 45% DS/45% HWF/10% ISP | 32.5 | 6.4        | 5.0   | 14.4     |
| 14  | 47.37% DS/47.37% HWF/5.26% ISP | 33.6 | 5.6 | 6.0 | 12.3 |
| 1   | 100 DS      | 34.7          | 4.3          | 5.5   | 12.4     |
| 4   | 90% DS/10% ISP | 32.1       | 6.7          | 5.5   | 14.1     |
| 7   | 90% DS/10% SF | 32.6        | 6.6          | 5.5   | 13.6     |
| 5   | 90% HWF/10% ISP | 33.20     | 5.6          | 4.5   | 12.6     |
| 13  | 90% HWF/10% ISP/Natural Color | 31.95 | 7.4 | 7.5 | 12.9 |
| 15  | 90% HWF/10% ISP Heat Treat A* | 33.55 | 6.4 | 4.5 | 12.3 |

*Autoclaved before extrustion.

Processing of all the experimental samples in the Demaco press proceeded with no significant problems. The water needed to adjust the samples to 31.5% absorption was derived using the moisture analysis of each cereal blend. samples 13 and 14 were blended during the experimental trials and a calculated moisture was derived based on the analysis of the components.

The cooked weights of all samples are within the desired range (30–40). The differences observed among the samples are not significant.

For cooking loss, again all samples yielded acceptable values of 0–10%. The color scores for all samples were rather similar. It should be noted that the Durum Semolina control product was in itself lower than the usual acceptable value of greater than 7.0. The samples did show significant differences in color by visual observation. It should be noted that the use of carotene to color spaghetti samples was successful. (Run 13). The material used, oleoresin, carrot-spray dried-water miscible made by Cal-Compack Foods, Inc., was added to the absorption water at 0.16% yielding a concentration of approximately 0.05% in the extruded spaghetti. Cooking of the colored spaghetti indicated the coloring material did not leach out during the cooking procedure.

In summary, it is seen that the objective color scores for all samples were low. Visual comparisons indicate that addition of isolated soy protein darkens all 100% cereal bases slightly. This is more noticeable with Soft Wheat Flour. A similar observation is true when isolated soy protein is used with 50/50 cereal base blends. At a low level of isolated soy protein addition (5.26%), a 50/50 Durum Semolina: Hard Wheat Flour blend is very similar in color to a 100% Durum Semolina control. Addition of soy flour darkens spaghetti more than a comparable addition of isolated soy protein.

Oleoresin or carrot may be used successfully to alter the color of spaghetti. This product exhibits good color stability upon cooking.

Sample 15 was prepared to determine if the vitreousness of the spaghetti could be increased by heat treatment of the cereal base prior to extrusion or heat treatment of the spaghetti after extrusion. No significant change in the samples was observed with the exception Several comparisons for firmness as determined on the Instron machine can be noted among the samples when prepared by a standard consumer use procedure (i.e., 20 minutes in boiling water).

1. 100% Durum Semolina (Run 1)>100% Hard Wheat Flour (Run 2)>100% Soft Wheat Flour (Run 3).

2. Addition of 10% soy protein isolate to each of the above cereal bases increased the firmness (Run 4, Run 5, Run 6).

3. Addition of 10% soy protein isolate (Run 11, Run 12) to blends of Durum Semolina/Hard Wheat Flour (Run 9) and Durum Semolina/Soft Wheat Flour (Run 10) increases the firmness to a level equal to or greater than the 100% Durum Semolina control (Run 1).

4. 5.26% isolated soy protein in a Durum Semolina/Hard Wheat Flour blend (Run 14) is comparable in firmness to an all Durum Semolina control (Run 1).

5. 10% isolated soy protein used with Durum Semolina (Run 4) yields a firmer testured product than 10% soy flour with Durum Semolina (Run 7).

Firmness as determined using the Instron Universal Testing Instrument indicates that 100% Durum Semolina spaghetti is firmer than spaghettis formulated with 100% Hard Wheat Flour or 100% Soft Wheat Flour. Addition of 10% isolated soy protein to each of these cereal bases increases the firmness. Utilizing isolated soy protein, 50/50 blends of Durum Semolina and Hard Wheat Flour or Durum Semolina and Soft Wheat Flour are comparable in firmness to a 100% Durum Semolina control. These observations were generally confirmed by organoleptic paneling.

e. Heat Processing Stability — Selected test samples were used to prepare spaghetti in tomato sauce, as follows:

| Sauce Formula | % | Product Formula | % |
|---------------|---|-----------------|---|
| Oleomargarine | 1.5 | Sauce | 70 |
| Starch (CPC S848) | 0.5 | Cooked Spaghetti | 30 |
| Paramesan Cheese | 3.0 | | |
| Tomato Paste | 40.0 | | |
| Paprika | 0.2 | | |
| Salt | 1.8 | | |
| Sugar | 2.6 | | |
| Onion | 0.9 | | |
| Vinegar (50 gr.) | 0.3 | | |

-continued

| Sauce Formula | % | Product Formula | % |
|---|---|---|---|
| Water | 49.2 | | |

The sauce was prepared by heating water to 180° F., then adding a starch slurry. After thorough mixing, the remaining ingredients were added and the sauce heated to 180° F. for 2 minutes. Spaghetti was cooked in a 1.2% salt solution for 20 minutes then cooled by placing the material in cold water. The spaghetti was then weighed individually into each can and the sauce added. Heat processing was at 230° F. for 60 minutes.

The canned material was poured into a screen to remove as much of the sauce as possible then the firmness of the spaghetti was determined using the Instron procedure listed previously with two modifications: (1) a 50g sample of material was used and (2) a flat plate with 83-⅛ inch diameter holes was used in the OTMC.

The results of the retort testing can be seen in TABLE IV below:

TABLE IV

| Run | Description | Firmness |
|---|---|---|
| 1 | 100% DS | 4.2 |
| 2 | 100% HWF | 1.4 |
| 3 | 100% SWF | 1.6 |
| 1 | 100% DS | 4.2 |
| 9 | 50% DS/50% HWF | 3.2 |
| 11 | 45% DS/45% HWF/10% ISP | 3.6 |
| 10 | 50% DS/50S SWF | 2.8 |
| 12 | 45% DS/45% SWF/10% ISP | 3.2 |
| 1 | 100% DS | 4.2 |
| 11 | 45% DS/45% HWF/10% ISP | 3.6 |
| 4 | 47.37% DS/47.37% HWF/5.26% ISP | 2.8 |

With respect to the stability to heat processing (spaghetti in tomato sauce) as determined by firmness, 100% Durum Semolina product was superior to the other samples tested; however, the 50/50 blend products of Durum Semolina and common wheat flours with 10% isolated soy protein also yielded acceptable products.

f. Organoleptic comparisons — Spaghetti samples were cooked for 20 minutes in boiling water, drained, then cooled slightly by running cold water over the samples. Canned spaghetti was heated to approximately 130° F. for evaluation by a panel for flavor and texture. The organolystic comparisons are set forth in TABLE V, following:

TABLE V

| Product | Test | Samples | Comments |
|---|---|---|---|
| Cooked Spaghetti | A | 1, 2, 3 | 1 firmest; 2 intermediate; 3 softest |
| Cooked Spaghetti | B | 1, 9, 10, 11, 12 | 1 & 11 firm; 9, 10 and 12 medium |
| Canned Spaghetti | C | 1, 2, 3 | 1 firm; 2 and 3 soft |
| Canned Spaghetti | D | 1, 9, 10, 11, 12 | 1 firm; 11 and 12 medium; 9 and 10 soft |

Organoleptic comparisons for firmness were less discriminating than the instrumental comparisons. Samples 1, 2 and 3 were ranked in decreasing order for firmness. When samples from Runs 1, 9, 10, 11 and 12 were compared, samples from Runs 1 and 11 were noted as being different (firmer).

Firmness as determined on the canned spaghetti was significantly less than that observed after 20 minutes of cooking. Organoleptic comparisons indicated the all Durum Semolina sample (Run 1) to be the firmest; however, the 50/50 blends of Durum Semolina and commen flours with isolated soy protein (Run 11, Run 12) yield acceptable products.

Flavor properties in comparisons among the plain cooked spaghettis and among the canned spaghetti in sauce samples indicated no significant differences.

Based on current prices for Durum Semolina wheat, Hard or Soft wheat flour and isolated soy protein, it is attractive to make blends utilizing as low as 3% isolated soy protein and still get beneficiation of the functional properties relative to 100% Durum Semolina use in pasta products. Preferably, at least about 5% isolated soy protein is employed which avoids the textural deterioration normally attendant on substituting harder soft wheat for Durum Semolina. Not only is there a functional improvement, but protein fortification, beneficial for dietary reasons, also accompanies the practice of the invention.

We claim:
1. An extruded pasta consisting essentially of a blend of about 3% to about 10% isolated soy protein with the remainder being wheat flour exclusive of water, said wheat flour being a member selected from the class consisting of hard wheat, soft wheat, a mixture of hard and soft wheats, a mixture of hard wheat and durum semolina, a mixture of soft wheat and durum semolina, and a mixture of hard wheat, soft wheat and durum semolina, the durum semolina when present in the above mixtures being less than 50% of the flour mixture.

* * * * *